United States Patent [19]
Shimabuku

[11] Patent Number: 5,429,209
[45] Date of Patent: Jul. 4, 1995

[54] GREASE FITTING ADAPTER

[76] Inventor: Randal R. Shimabuku, P.O. Box 141, Wailuku, Hi. 96793

[21] Appl. No.: 203,393

[22] Filed: Mar. 1, 1994

[51] Int. Cl.[6] ...................... F01M 11/04; F16N 21/00
[52] U.S. Cl. ...................... 184/105.2; 184/105.3; 141/383; 285/38; 285/40; 285/333; 285/390
[58] Field of Search ...................... 184/6.12, 28, 105.1, 184/105.2, 105.3; 141/383, 384; 285/38, 40, 333, 390

[56] References Cited

U.S. PATENT DOCUMENTS

| | | | |
|---|---|---|---|
| 1,630,321 | 5/1927 | Woodruff | 184/28 |
| 3,180,533 | 4/1965 | Sundholm | 184/105.3 |
| 3,625,310 | 12/1971 | Herrick | 184/6.12 |
| 3,680,639 | 8/1972 | Davis | 172/15 |
| 4,027,743 | 6/1977 | Deller et al. | 184/105.1 |
| 4,054,305 | 10/1977 | Gajajiva et al. | 285/40 |
| 4,567,925 | 2/1986 | Broussard | 184/105.3 |
| 4,946,077 | 8/1990 | Olsen | 184/105.2 |

FOREIGN PATENT DOCUMENTS

| | | | |
|---|---|---|---|
| 1294758 | 5/1969 | Germany | 285/40 |
| 0248867 | 3/1926 | United Kingdom | 184/105.3 |

Primary Examiner—Edward K. Look
Assistant Examiner—Christopher Verdier
Attorney, Agent, or Firm—Michael I. Kroll

[57] ABSTRACT

A grease fitting adapter for lubricating a gearbox having a grease fitting aperture in a gas operated lawn trimmer is provided, which consists of a grease source. A structure is for conveying grease from the grease source through the grease fitting aperture in the gearbox, after a grease fitting is removed from the grease fitting aperture.

5 Claims, 2 Drawing Sheets

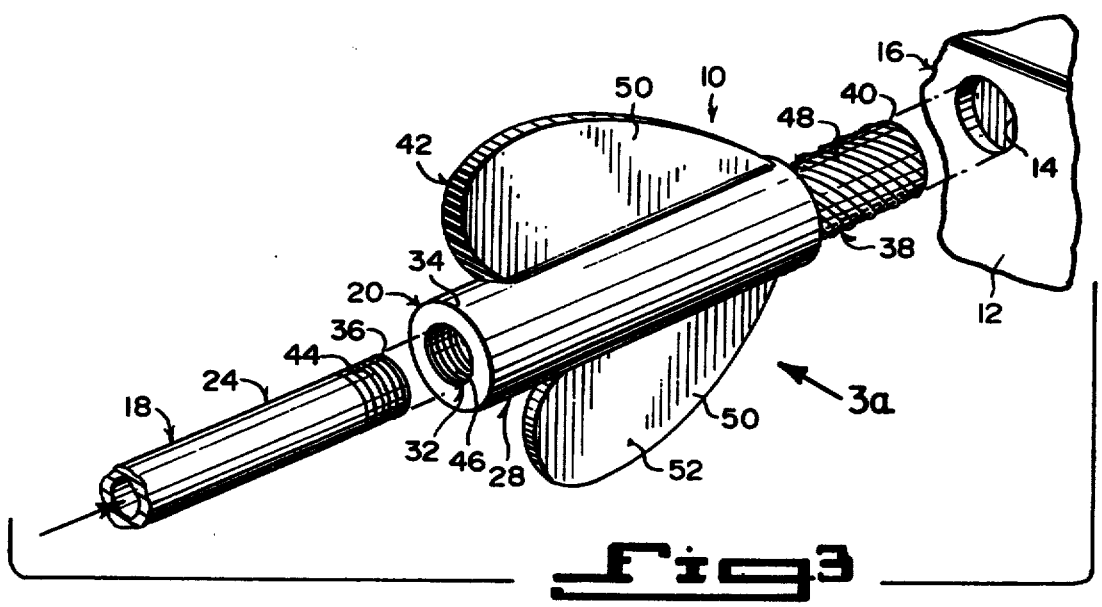
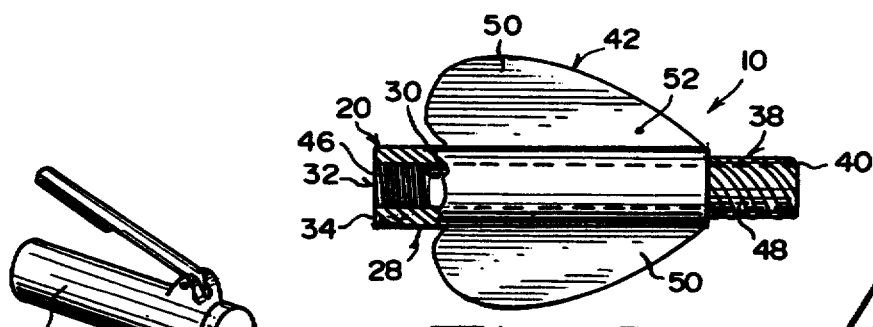
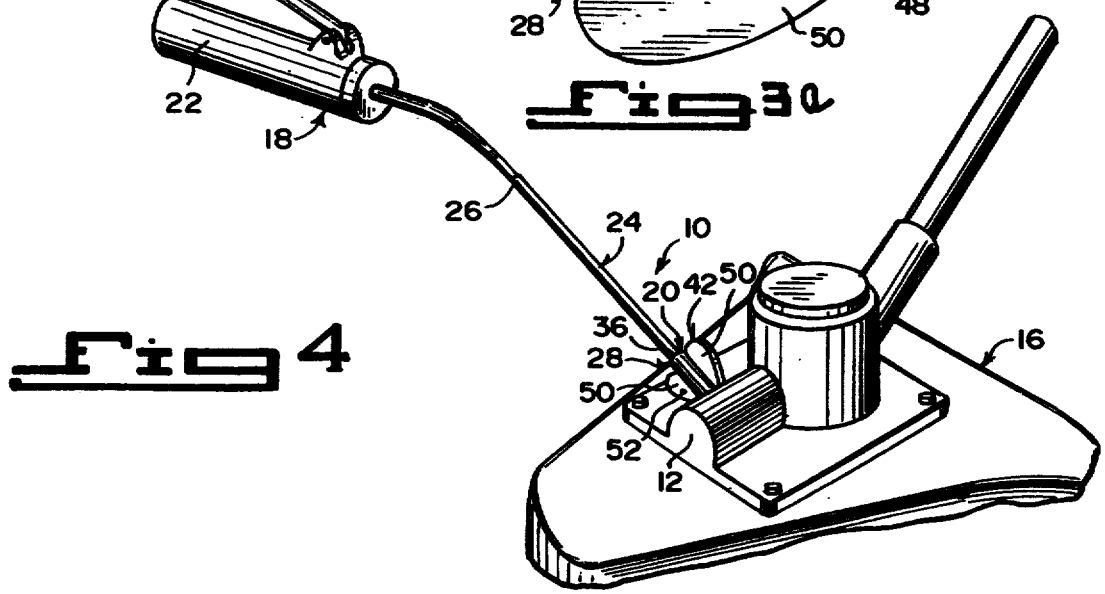

GREASE FITTING ADAPTER

BACKGROUND OF THE INVENTION

1. Field of the Invention

The instant invention relates generally to lubrication fittings and more specifically it relates to a grease fitting adapter.

2. Description of the Prior Art

Numerous lubrication fittings have been provided in prior art. For example, U.S. Pat. Nos. 2,515,611 to Preszler; 3,144,916 to Lien; 4,567,925 to Broussard and 4,892,171 to Scheindel all are illustrative of such prior art. While these units may be suitable for the particular purpose to which they address, they would not be as suitable for the purposes of the present invention as heretofore described.

Preszler, Alvin
FLEXIBLE SHAFT GREASING FITTING
U.S. Pat. No. 2,515,611

A lubricating coupling for flexible shafts is provided, having a revoluble power conducting member, an axially aligned lubricant admission opening in its upper end and a tubular non-revoluble flexible casing. A connector for supply of a lubricant comprises a clamping means for gripping the edge of an outwardly flared terminal edge of the casing, while leaving the power conduction member free to revolve in the casing. The clamping means includes a tubular upper member fitting in spaced relation around the power conducting member. A lower tubular member is fitted closely on the casing. The last two members have confronting bevelled casing edge gripping faces and removable means normally closing the lubricant admission opening.

Lien, Harold G.
CABLE HOUSING GREASE FITTING
U.S. Pat. No. 3,144,916

A cable housing grease fitting structure comprising a bracket. A sleeve is secured to the bracket with a portion of the sleeve inside and a portion outside the bracket. A resilient washer is mounted in the portion of the sleeve on the inside of the bracket. A means on the bracket is for interacting with a cable housing for forcing the resilient washer into grease-tight association with a cable housing. A check valve type grease fitting is removably inserted in a portion of the sleeve extending outside the bracket.

Broussard, Ronney L.
SPEEDOMETER AND TACHOMETER CABLE GREASING ADAPTOR
U.S. Pat. No. 4,567,925

A speedometer and tachometer cable greasing adaptor enables grease to be applied into either a speedometer or tachometer cable housing in which the cable rotates. The cable housing is unscrewed from the vehicle's transmission or motor and any connecting devices are removed from the cable housing, but not the cable itself. The greasing adaptor has external threads that fit the internal threads on the bottom end of the cable housing. The threaded end of the greasing adaptor is then screwed into the threaded cable housing and is attached securely. An ordinary grease gun is then attached to the grease fitting location on the greasing adaptor. A sufficient amount of grease can then be pumped through the greasing adaptor into the cable housing without removing the cable from the housing.

Scheindel, Christian T.
ADAPTER FOR USE WITH A LUBRICATION FITTING
U.S. Pat. No. 4,892,171

There is disclosed an adapter for use with a lubrication fitting of the type which includes a flow restrictor normally biased to a closed position to restrict the flow of fluid. The adapter comprises a generally tubular body having a top end and a bottom end. The top end of the tubular body is shaped and dimensioned to removably receive the output port of the lubrication fitting. A pin is centrally positioned in the tubular body proximate the top end thereof. The pin is adapted to enter an opening of the lubrication fitting to move the flow restrictor from its normally closed position to an open position in which fluid can flow. The disclosed adapter is featured in that the diameter of the pin is smaller than the diameter of the opening of the lubrication fitting. The pin is fixed to a separating disc which is mounted to the tubular body and is provided with a plurality of openings for allowing the fluid to flow into the lubrication fitting.

SUMMARY OF THE INVENTION

A primary object of the present invention is to provide a grease fitting adapter that will overcome the shortcomings of the prior art devices.

Another object is to provide a grease fitting adapter that will allow a person to thoroughly lubricate a gearbox in a gas operated lawn trimmer.

An additional object is to provide a grease fitting adapter that contains wing extensions, so that the adapter can be manually screw tapped into a grease fitting aperture in the gearbox, after the grease fitting is removed therefrom, allowing a distal end of an elongated pipe from a grease gun to be screwed into the adapter for applying grease directly through the adapter into the gearbox.

A further object is to provide a grease fitting adapter that is simple and easy to use.

A still further object is to provide a grease fitting adapter that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is an exploded perspective view taken in the direction of arrow 3 in FIG. 2.

FIG. 3a is an elevational view of the instant invention per se, with parts in section taken in the direction of arrow 3a in FIG. 3.

FIG. 4 is a perspective view similar to FIG. 1, showing the grease gun coupled to the elongated pipe.

DETAILED DESCRIPTION OF THE PREFERRED EMBODIMENTS

Figure 1:
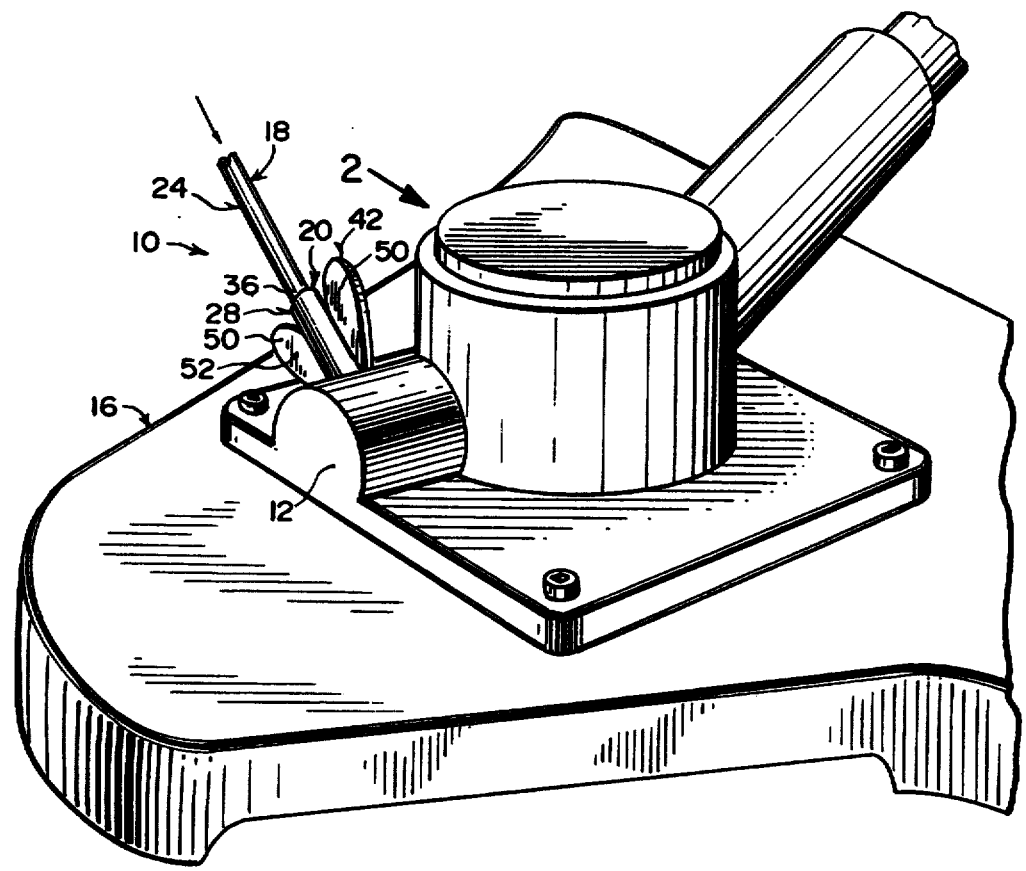
FIG. 1 is a perspective view of a gas operated lawn trimmer with parts broken away, showing the instant invention connected to the gearbox.
Figure 2:
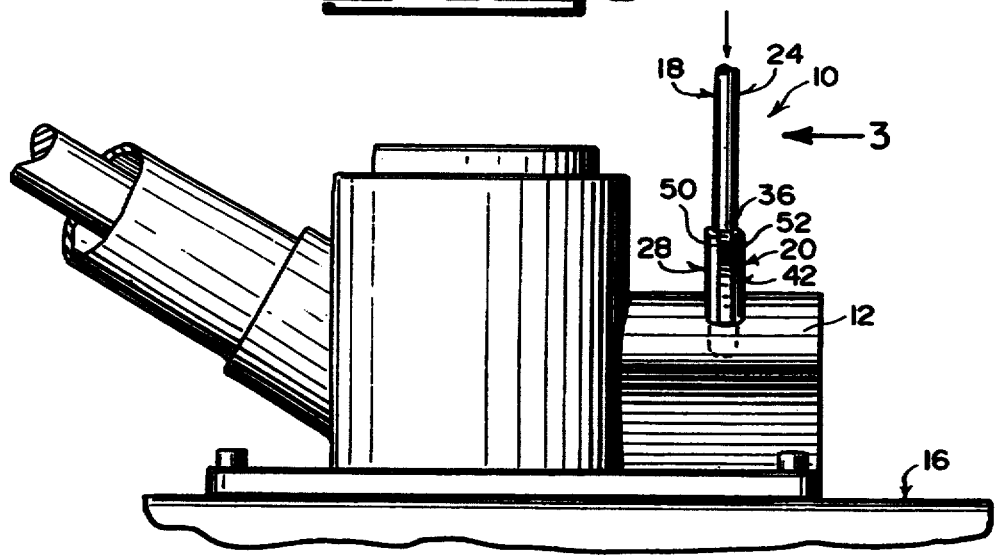
FIG. 2 is an elevational view taken in the direction of arrow 2 in FIG. 1.

Turning now descriptively to the drawings, in which similar reference characters denote similar elements throughout the several views, FIGS. 1 through 4 illustrate a grease fitting adapter 10 for lubricating a gearbox 12 having a grease fitting aperture 14 in a gas operated lawn trimmer 16, which consists of a grease source 18. A structure 20 is for conveying grease from the grease source 18 through the grease fitting aperture 14 in the gearbox 12, after a grease fitting is removed from the grease fitting aperture 14.

The grease source 18 includes a grease gun 22 and an elongated pipe 24 connected at a first end 26 to the grease gun 22. The grease conveying structure 20 contains a one piece main body 28, having a longitudinal bore 30 therethrough. A component 32 at a first end 34 of the main body 28, is for connecting with a second end 36 of the elongated pipe 24. A component 38 at a second end 40 of the main body 28, is for connecting with the grease fitting aperture 14 in the gearbox 12.

The grease conveying structure 20 further contains elements 42 on the main body 28 between the first end 34 and the second end 40, for manually twisting the second connecting component 38 into the grease fitting aperture 14 in the gearbox 12.

The first connecting component 32 consists of the elongated pipe 24 having external threads 44 on the second end 36. The main body 28 has internal threads 46 on the bore 30 at the first end 34. The external threads 44 on the second end 36 of the elongated pipe 24 can screw into the internal threads 46 in the bore 30 at the first end 34.

The second connecting component 38 includes the main body 28 having external self tapping threads 48 on the second end 40. The external self tapping threads 48 on the second end 40 can screw into the grease fitting aperture 14 in the gearbox 12.

The manually twisting elements 42 are a pair of wing extensions 50 extending from opposite locations on the main body 28. A person can grip the wing extensions 50 to turn the main body 28. The main body 28 is generally cylindrical in shape. The grease conveying structure 20 is fabricated out of a strong durable material 52. The strong durable material 52 can be a ferrous metal. The ferrous metal is selected from a group consisting of iron, steel and stainless steel.

The strong durable material 52 can be a non-ferrous metal. The non-ferrous metal is selected from a group consisting of aluminum, copper and brass. The strong durable material 52 can also be plastic.

OPERATION OF THE INVENTION

To use the grease fitting adapter 10, the following steps should be taken:

1. Remove the old grease fitting from the grease fitting aperture 14 in the gearbox 12 of the gas operated lawn trimmer 16.
2. Grip the wing extensions 50 by a hand.
3. Place the second end 40 with the external self tapping threads 48 into the grease fitting aperture 14 in the gearbox 12.
4. Rotate the main body 28 with the wing extensions 50, so that the second end 40 will snugly fit into the grease fitting aperture 14.
5. Screw the external threads 44 on the second end 36 of the elongated pipe 24 into the internal threads 46 in the bore 30 at the first end 34 of the main body 28.
6. Connect the grease gun 22 to the first end 26 of the elongated pipe 24.
7. Operate the grease gun 22, so that grease will be conveyed from the grease gun 22 into the grease fitting aperture 14 in the gearbox 12.

LIST OF REFERENCE NUMBERS 10 grease fitting adapter
12 gearbox
14 grease fitting aperture in 12
16 lawn trimmer
18 grease source
20 grease conveying structure
22 grease gun
24 elongated pipe
26 first end of 24
28 one piece main body
30 longitudinal bore in 28
32 first connecting component
34 first end of 28
36 second end of 24
38 second connecting component
40 second end of 28
42 manually twisting element
44 external threads on 36
46 internal threads on 30 at 34
48 external self tapping threads on 40
50 wing extension
52 strong durable material It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A grease fitting adapter for lubricating a gearbox having a grease fitting aperture for use in and in combination with a gas operated lawn trimmer which comprises:
   a) a grease source comprising a grease gun and an elongated pipe connected at a first end to said grease gun; and
   b) means for conveying grease from said grease source through the grease fitting aperture in the gearbox, after a grease fitting is removed from the grease fitting aperture comprising a one piece main body generally cylindrical in shape having a longitudinal bore therethrough, means at a first end of said main body for connecting with a second end of said elongated pipe, means at a second end of said main body for connecting with the grease fitting aperture in the gear box, and means on said main body between the first end and the second end for manually twisting said second connecting means into the grease fitting aperture in the gearbox, said manually twisting means including a pair of wing extensions extending from opposite locations on said main body, so that a person can grip said wing extensions to turn said main body;

c) said elongated pipe having external threads on the second end thereof, and said main body having internal threads on the bore at the first end, so that said external threads on the second end of said elongated pipe can screw into said internal threads on the bore at the first end; and d) said main body having external self tapping threads on the second end thereof, so that said external self tapping threads on the second end can screw into the grease fitting aperture in the gear box.

2. A grease fitting adapter as recited in claim 1, wherein said grease conveying means is fabricated out of a ferrous metal.

3. A grease fitting adapter as recited in claim 2, wherein said ferrous metal is selected from a group consisting of iron, steel and stainless steel.

4. A grease fitting adapter as recited in claim 1, wherein said grease conveying means is fabricated from a non-ferrous metal.

5. A grease fitting adapter as recited in claim 4, wherein said non-ferrous metal is selected from a group consisting of aluminum, copper and brass.

* * * * *